United States Patent
Park et al.

(10) Patent No.: US 10,438,317 B2
(45) Date of Patent: Oct. 8, 2019

(54) METHOD AND APPARATUS FOR RENDERING

(71) Applicant: Samsung Electronics Co., Ltd., Suwon-si (KR)

(72) Inventors: Jeongae Park, Seoul (KR); Wonjong Lee, Seoul (KR); Seunghun Jin, Suwon-si (KR); Soojung Ryu, Hwaseong-si (KR); Yeongon Cho, Hwaseong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 657 days.

(21) Appl. No.: 14/801,108

(22) Filed: Jul. 16, 2015

(65) Prior Publication Data
US 2016/0078637 A1    Mar. 17, 2016

(30) Foreign Application Priority Data
Sep. 12, 2014 (KR) .................. 10-2014-0121273

(51) Int. Cl.
*G06T 1/60* (2006.01)
*G06T 15/04* (2011.01)

(52) U.S. Cl.
CPC ............. *G06T 1/60* (2013.01); *G06T 15/04* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 6,304,268 B1 | 10/2001 | Iourcha et al. | |
| 6,654,023 B1* | 11/2003 | Peterson | G06T 15/04 345/582 |
| 2002/0012002 A1* | 1/2002 | Ito | G06T 15/04 345/552 |
| 2008/0106552 A1* | 5/2008 | Everitt | G06T 11/001 345/552 |
| 2014/0139527 A1 | 5/2014 | McKellar | |
| 2014/0267283 A1* | 9/2014 | Nystad | G06T 9/00 345/428 |

FOREIGN PATENT DOCUMENTS

| | | |
|---|---|---|
| JP | 2008-84302 A | 4/2008 |
| KR | 10-2010-0068603 A | 6/2010 |
| KR | 10-2013-0096271 A | 8/2013 |

* cited by examiner

*Primary Examiner* — Aaron M Richer
(74) *Attorney, Agent, or Firm* — Harness, Dickey & Pierce, P.L.C.

(57) ABSTRACT

A rendering method includes generating mipmap images of some levels with respect to texture and storing the generated mipmap images in a storage, receiving a request for the texture, calculating a level of a mipmap requested for the texture, determining whether the stored mipmap images include the mipmap image of the calculated level, and performing rendering by using at least one of the stored mipmap images, based on a result of the determining.

17 Claims, 6 Drawing Sheets

METHOD AND APPARATUS FOR RENDERING

CROSS REFERENCE TO RELATED APPLICATION(S)

This application claims the benefit of Korean Patent Application No. 10-2014-0121273, filed on Sep. 12, 2014, in the Korean Intellectual Property Office, the disclosure of which is incorporated herein in its entirety by reference.

BACKGROUND

1. Field

The present disclosure relates to a method and apparatus for rendering using a mipmap.

2. Description of Related Art

Texture mapping is a technique in which a detailed texture or a color is applied to a surface of a three-dimensional (3D) virtual object in computer graphics. A texture is an image applied to a surface of an object during texture mapping. In general, a two-dimensional (2D) texture that is a two-dimensional still image is used in texture mapping. In this regard, a "mipmap" technique is used to improve a rendering speed and prevent aliasing.

In the texture mapping field of 3D graphics, a mipmap is a collection of bitmap images formed of a basic texture and textures that are previously, consecutively reduced textures of the basic texture, to improve a rendering speed. When using the mipmap, an appropriate texture is used considering the size of an object to be covered with the texture at the final result. In other words, mipmap images of various sizes are prepared and texture mapping is performed by using a mipmap image having a size that is most approximate to a polygon to be mapped.

In order to use the mipmap, bitmap data of a mipmap image collection are previously generated and stored in a memory. When a mipmap image is generated by reducing horizontal and virtual lengths of the mipmap image to ½, about 1.33 times of memory capacity is needed, compared to a case in which only an original image (a mipmap image of level 0) is stored.

In the texture mapping, as the size of a texture increases for a high quality image, storage capacity is increased and transmission costs are increased, and thus, a load is applied to a system. Accordingly, research to reduce computational burden for generating mipmaps and memory usage, which are needed due to the use of a mipmap, is being performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A rendering method is provided which generates and stores mipmap images of some levels and performs rendering by using at least one of the stored mipmap images of some levels according to whether a level of a requested mipmap is stored.

Additional aspects will be set forth in part in the description which follows and, in part, will be apparent from the description, or may be learned by practice of the presented embodiments.

According to an embodiment, a rendering method includes: generating, using a processor, mipmap images of some levels with respect to texture and storing the generated mipmap images in a storage; receiving, at the processor, a request for the texture; calculating, using the processor, a level of a mipmap requested for the texture; determining, using the processor, whether the stored mipmap images include a mipmap image of the calculated level; and performing rendering, using the processor, by using at least one of the stored mipmap images, based on a result of the determination.

The rendering may be performed by using the stored mipmap image of the calculated level when the determining determines that the stored mipmap images comprise the mipmap image of the calculated level.

The rendering may be performed by using at least one mipmap image of a level adjacent to the calculated level, among the stored mipmap images, when the determining determines that the stored mipmap images do not comprise the mipmap image of the calculated level.

The performing of the rendering may include: determining a degree of color change of a texture image, generating the mipmap image of the calculated level when the degree of color change is greater than a preset threshold color change value, and performing rendering by using the generated mipmap image of the calculated level.

The performing of the rendering may include determining a degree of color change of a texture image, and performing the rendering by using a mipmap image of a higher level subsequent to the calculated level, among the stored mipmap images, when the degree of color change is less than a preset threshold color change value.

The performing of the rendering may include determining a frequency of access to the texture, and performing the rendering by using a mipmap image of a level adjacent to the calculated level, among the stored mipmap images, based on a result of the determination.

The performing of the rendering may include generating the mipmap image of the calculated level and storing the generated mipmap image of the calculated level in the storage, when the frequency of access is greater than a preset threshold frequency of access value, and performing the rendering by using the generated mipmap image of the calculated level.

The performing of rendering may include generating the mipmap image of the calculated level by using a mipmap image of a lower level prior to the calculated level, among the stored mipmap images, when the frequency of access is less than a preset threshold frequency of access value, and performing rendering by using the mipmap image of the calculated level.

The determining of the frequency of access may include counting a frequency of access at a previous frame with respect to the texture.

The generating of the mipmap image of the calculated level may include: determining a frequency of access to the texture; generating the mipmap image of the calculated level and storing the generated mipmap image of the calculated level in the storage when the frequency of access is greater than a preset threshold frequency of access value; and generating the mipmap image of the calculated level by using a level prior to the calculated level when the frequency of access is less than or equal to the preset threshold frequency of access value.

The rendering may be performed according to a preset mode based on a user input, among a mode of performing rendering by generating a mipmap image of the calculated level by using a mipmap image of a lower level prior to the calculated level, among the stored mipmap images, and a mode of performing rendering by using a mipmap image of a higher level subsequent to the calculated level, among the stored mipmap images.

According to another embodiment, a rendering apparatus includes a storage configured to store mipmap images of some levels that are previously generated with respect to texture, and a processor including a determiner and a renderer. The determiner is configured to receive a request for the texture, calculate a level of a mipmap requested for the texture, and determine whether the stored mipmap images include a mipmap image of the calculated level. The renderer is configured to perform rendering by using at least one of the stored mipmap images, based on a result of the determination.

The renderer may be configured to perform the rendering by using the stored mipmap image of the calculated level when the determiner determines that the stored mipmap images comprise the mipmap image of the calculated level.

The renderer may be configured to perform the rendering by using at least one mipmap image of a level adjacent to the calculated level, among the stored mipmap images, when the determiner determines that the stored images do not comprise the mipmap image of the calculated level.

The rendering apparatus may include a generator configured to generate the mipmap image of the calculated level when the degree of color change of a texture image is greater than a preset threshold color change value. The determiner may be configured to determine the degree of color change of the texture image and the renderer may be configured to perform the rendering by using the generated mipmap image of the calculated level, when the determiner determines that the stored mipmap images do not comprise the mipmap image of the calculated level.

The determiner may be configured to determine the degree of color change of a texture image when the stored mipmap images do not comprise the mipmap image of the calculated level, and the renderer may be configured to perform the rendering by using a mipmap image of a higher level subsequent to the calculated level, among the stored mipmap images, when the degree of color change is less than or equal to a preset threshold color change value.

When the stored mipmap images do not comprise the mipmap image of the calculated level, the determiner is configured to determine a frequency of access to the texture and the renderer is configured to perform the rendering by using a mipmap image of a level adjacent to the calculated level, among the stored mipmap images, based on a result of the determination of the frequency of access.

The generator may be configured to generate the mipmap image of the calculated level when the frequency of access is greater than a preset threshold frequency of access value. The storage may be configured to store the generated mipmap image of the calculated level and the renderer may be configured to perform the rendering by using the stored mipmap image of the calculated level.

The generator may be configured to generate the mipmap image of the calculated level by using a mipmap image of a lower level prior to the calculated level, among the stored mipmap images, if the frequency of access is less than a preset threshold frequency of access value. The renderer may be configured to perform the rendering by using the generated mipmap image of the calculated level.

According to another embodiment, a rendering method includes: storing mipmap images of some mipmap levels; receiving, at a processor, a request for texture; determining, using the processor, whether the stored mipmap images comprise a mipmap image of a mipmap level matching a mipmap level requested in the request for texture; and performing rendering, at the processor, by using at least one of the stored mipmap images, based on a result of the determining.

A quantity of the some mipmap levels may be less than a quantity of all available mipmap levels.

The some mipmap levels may include mipmap levels at a predetermined fixed interval that is greater than a single-level interval.

Other features and aspects will be apparent from the detailed description, the drawings and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Terms such as "first" and "second" are used herein merely to describe a variety of constituent elements, but the constituent elements are not limited by the terms. Such terms are used only for the purpose of distinguishing one constituent element from another constituent element. For example, without departing from the right scope of the present inventive concept, a first constituent element may be referred to as a second constituent element, and vice versa.

In the present specification, when a constituent element "connects" or is "connected" to another constituent element, the constituent element contacts or is connected to the other constituent element directly or through at least one of other constituent element. Conversely, when a constituent element is described to "directly connect" or to be "directly connected" to another constituent element, the constituent element should be construed to be directly connected to another constituent element without any other constituent element interposed therebetween. Other expressions, such as, "between" and "directly between", describing the relationship between the constituent elements, may be construed in the same manner.

Terms used in the present specification are used for explaining a specific example embodiment, not for limiting the inventive concept. Thus, an expression used in a singular form in the present specification also includes the expression in its plural form unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

In the present specification, when a constituent element "connects" or is "connected" to another constituent element, the constituent element contacts or is connected to the other constituent element not only directly, but also electrically through at least one of other constituent elements interposed therebetween. Also, when a part may "include" a certain constituent element, unless specified otherwise, it may not be construed to exclude another constituent element but may be construed to further include other constituent elements.

In the present specification, "a degree of color change" may denote a difference between the color of a pixel and the colors of neighboring pixels. In other words, when the color of a pixel radically changes to the colors of neighboring pixels, a degree of color change is large. When the color of a pixel gradually changes to the colors of neighboring pixels, a degree of color change is small.

In the present specification, "frequency of access" denotes the number of requests for a certain texture. In other words, the frequency of access increases as requests for a certain texture increase. The frequency of access decreases as the requests for a certain texture decrease.

Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or example language (e.g., "such as") provided herein, is intended merely to better illuminate the disclosed subject matter and does not pose a limitation on the scope of the subject matter unless otherwise claimed. As used herein, the term "and/or" includes any and all combinations of one or more of the associated listed items. Expressions such as "at least one of," when preceding a list of elements, modify the entire list of elements and do not modify the individual elements of the list.

Reference will now be made in detail to embodiments, examples of which are illustrated in the accompanying drawings.

Figure 1:
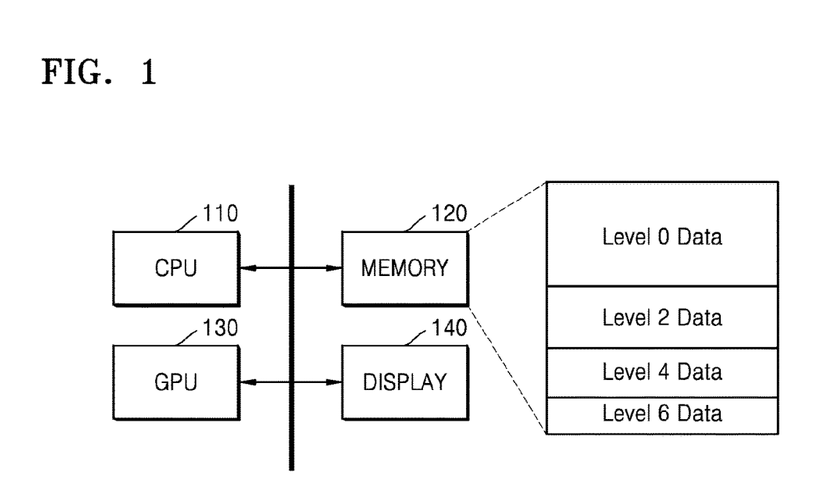
FIG. 1 is a diagram of a system which performs graphic rendering by using a mipmap, according to an example embodiment.

FIG. 1 is a conceptual diagram of a system which performs graphic rendering by using a mipmap image, according to an embodiment.

A mipmap is formed of a plurality of images obtained by reducing a single image. The mipmap has levels of about 6 to 8 although a level thereof varies according to an example embodiment. A low level indicates an original image having high precision and a high level indicates an image having low precision. As a mipmap level increases, the horizontal and vertical lengths of an image generally are decreased by $2^{Level\ of\ Detail}$, that is, 2 to the power of "level of detail". An image is generally reduced simultaneously in both directions along an X-axis and a Y-axis. However, an image may be reduced by applying different ratios to the X-axis and Y-axis, thereby improving the quality of a final product. The level of detail to be used is determined by a calculation. When an object is projected large onto a screen, a low level of detail is selected. When an object using the same texture is projected small onto a screen, a high level of detail is selected.

In general, when a two-dimensional (2D) image to be used as texture is generated, operations of texture binding, allotting memory space to store a mipmap, generating a mipmap, and using a mipmap are sequentially performed.

In a mipmap of the related art, pieces of data of all levels are stored in a memory. However, in the mipmap according to an example embodiment, since only pieces of data of some levels among a plurality of available preset levels are stored in a memory 120, the computational burden for generating mipmaps and memory usage required by a use of a mipmap may be reduced.

A graphics processing unit (GPU) 130 may receive a command to render graphic images from a central processing unit (CPU) 110. The GPU 130 performs texturing by using mipmap images stored in the memory 120 on a texture request. The memory 120 may be an internal memory of the GPU 130 or an external memory.

Referring to FIG. 1, only mipmap images corresponding to levels 0, 2, 4, and 6 are stored in the memory 120. For example, when a mipmap image of level 1 is needed, the GPU 130 may perform rendering by using the mipmap image of level 0 or 2 that is stored in the memory 120.

The GPU 130 may output a graphic image from completed rendering through a rendering pipeline to a display 140.

Figure 2:
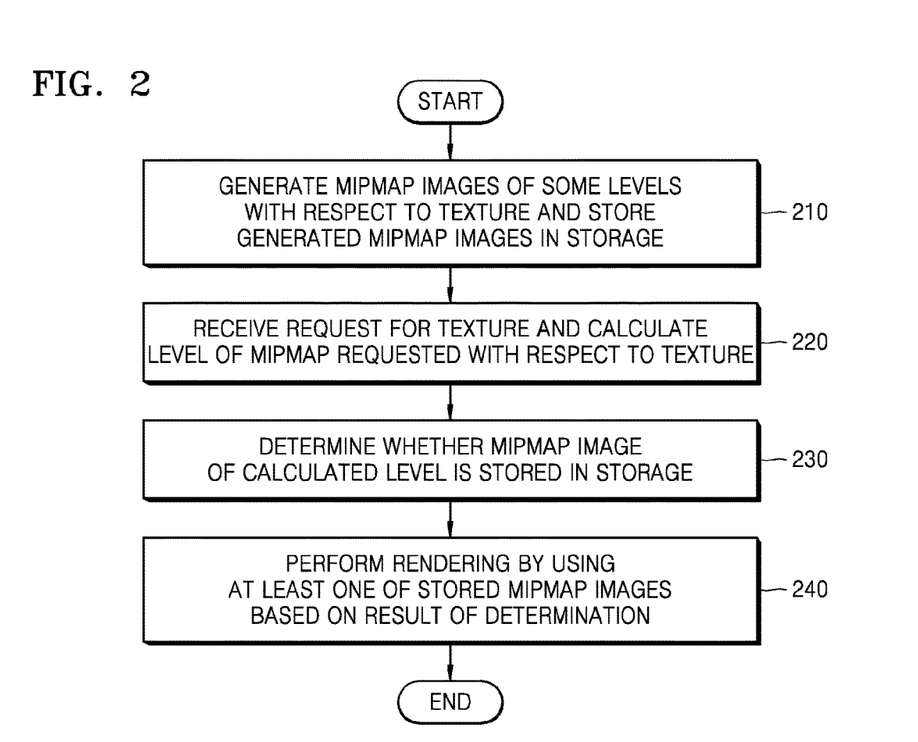
FIG. 2 is a flowchart of a rendering method according to an example embodiment.

FIG. 2 is a flowchart of a rendering method according to an embodiment.

In operation 210, a rendering apparatus generates mipmap images of some levels with respect to texture and stores the generated mipmap images in a storage. That is, the rendering apparatus does not generate and store mipmap images of all available levels, but rather generates and stores only mipmap images of some levels among the plurality of available preset levels.

The rendering apparatus according to an embodiment may generate mipmap images of levels at a predetermined fixed interval (such as an interval that is greater than a single-level interval), and store the generated mipmap images in the storage. For example, the rendering apparatus may generate mipmap images of levels 0, 2, 4, 6, 8, and 10 only, among all available levels of 0 to 10, and may store the generated mipmap images in the storage. In another example, the rendering apparatus may generate mipmap images of levels of 0, 3, 6, and 9 only, among all available levels 0 to 10, and may store the generated mipmap images in the storage.

Since the rendering apparatus according to the embodiment described above generates and stores mipmap images of some levels only, a total number of calculations and memory usage may be reduced.

In operation 220, the rendering apparatus receives a texture request and calculates a level of a mipmap requested for the texture.

The rendering apparatus may calculate a level of detail with respect to the texture to be used for an object. The rendering apparatus, upon receiving a request for texture generated by pixel shading, may calculate a level of a mipmap to be referred to by using an address generation unit (not shown). The calculation of a level of detail may be performed by a host process or by separate hardware, but the present exemplary embodiment is not limited thereto.

In operation 230, the rendering apparatus determines whether a mipmap image of a calculated level is stored in the storage. The rendering apparatus may determine whether a mipmap image of a calculated level is stored in the storage, by using a data stream indicating a level at which a mipmap image is stored among all levels of detail.

In operation 240, the rendering performs rendering by using at least one of the stored mipmap images of some levels, based on a result of determination in operation 230.

More specifically, in step 240, when it is determined in operation 230 that a mipmap image of the calculated level is stored in the storage, the rendering apparatus receives the mipmap image of the calculated level from the storage and performs rendering. Alternatively, when it is determined in operation 230 that the mipmap image of the calculated level is not stored in the storage as a result of the determination, the rendering apparatus performs rendering in operation 240 by using at least one of the stored mipmap images of levels adjacent to the calculated level (e.g., a next level prior to or subsequent to the calculated level).

The rendering apparatus may perform rendering according to a degree of color change of a texture image. For example, when a degree of color change is greater than a preset threshold color change value as a result of the determination of a degree of color change of a texture image, the rendering apparatus may generate a mipmap image of the calculated level. The rendering apparatus may perform rendering by using the stored mipmap image of the calculated level. In another example, when a degree of color change is less than the preset threshold color change value as a result of the determination of a degree of color change of a texture image, rendering may be performed by using a stored mipmap image of a higher level subsequent to the calculated level. A detailed description of the aforementioned processes will follow in a description with reference to FIG. 3.

A rendering apparatus according to another embodiment may perform rendering according to frequency of access to texture. The rendering apparatus may determine frequency of access to texture and perform rendering by using a mipmap image of a level adjacent to the calculated level, based on a result of the determination. For example, if the frequency of access is greater than a preset threshold frequency of access value, the rendering apparatus may generate a mipmap image of the calculated level and store the generated mipmap image in the storage, and may perform rendering by using the mipmap image of the calculated level. In another example, if the frequency of access is less than the preset threshold frequency of access value, the rendering apparatus may generate the mipmap image of the calculated level by using the stored mipmap image of a lower level prior to the calculated level and may perform rendering by using the mipmap image of the calculated level.

A rendering apparatus according to another embodiment may perform rendering according to a preset mode based on a user input, among a mode of performing rendering by generating a mipmap image of the calculated level by using a stored mipmap image of a lower level prior to the calculated level, and a mode of performing rendering by using a mipmap image of a higher level subsequent to the calculated level.

In the rendering method according to the above embodiment, since mipmap images of all levels are not generated during a use of a mipmap, the amount of calculations may be reduced. Also, in the rendering method according to the above embodiment, since mipmap images of all levels are not stored, memory usage may be reduced.

Figure 3:
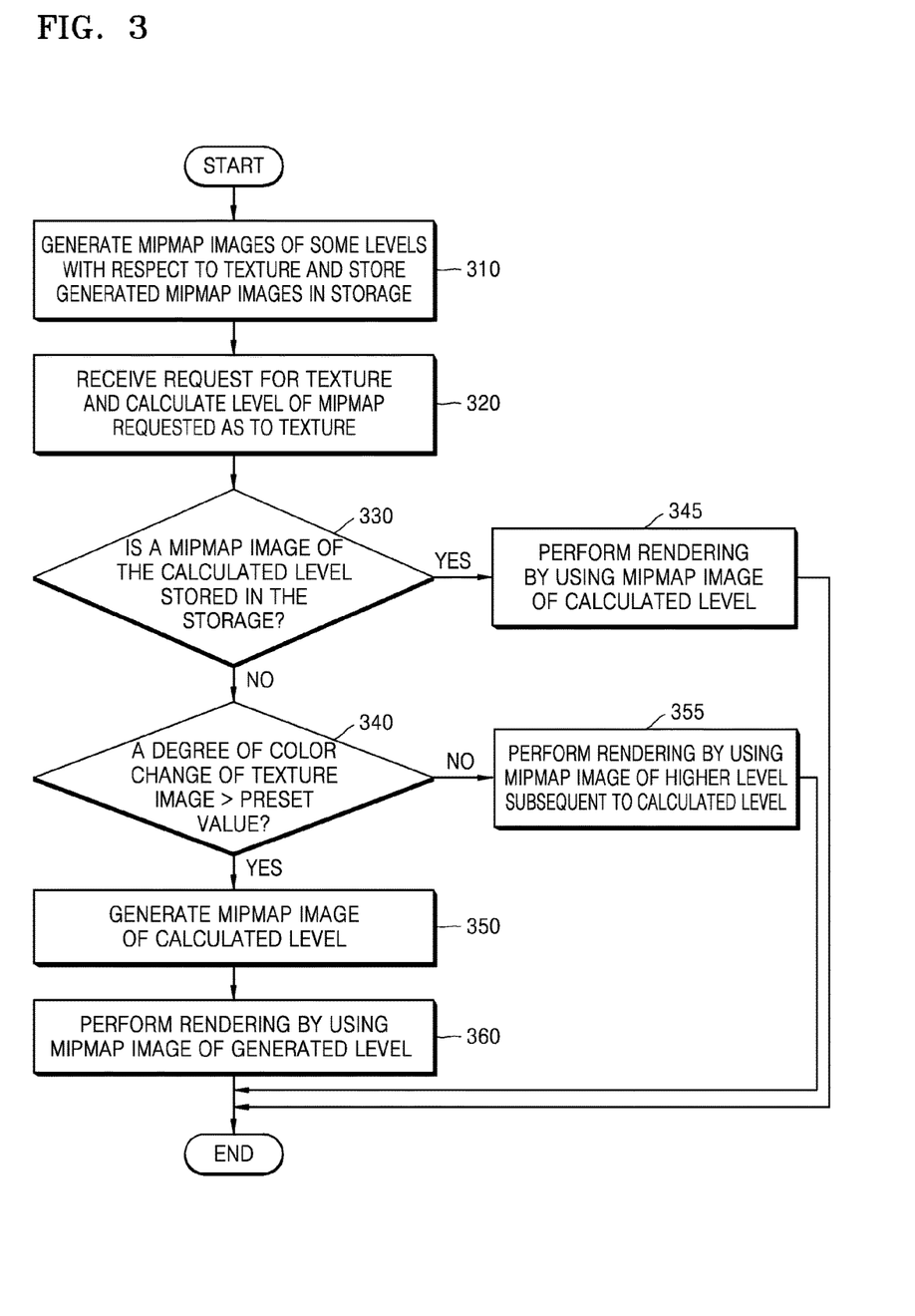
FIG. 3 is a flowchart of a method of performing rendering by determining a degree of color change, according to an example embodiment.

FIG. 3 is a flowchart of a method of performing rendering by determining a degree of color change, according to an example embodiment.

In operation 310, the rendering apparatus generates mipmap images of some levels with respect to texture and stores the generated mipmap images in the storage.

Since operation 310 of FIG. 3 is the same as operation 210 of FIG. 2, a redundant description of operation 310 is omitted.

In operation 320, the rendering apparatus receives a request for texture and calculates a level of mipmap requested with respect to the texture. Since operation 320 of FIG. 3 is the same as operation 220 of FIG. 2, a redundant description of operation 320 is omitted.

In operation 330, the rendering apparatus determines whether a mipmap image of the calculated level is stored in the storage. As a result of the determination, if the mipmap image of the calculated level is stored in the storage, operation 345 is performed. In operation 345, the rendering apparatus performs rendering by using the mipmap image of the calculated level stored in the storage.

Alternatively, if it is determined in step 330 that the mipmap image of the calculated level is not stored in the storage, operation 340 is performed. In operation 340, the rendering apparatus determines whether a degree of color change of the texture is greater than a preset threshold color change value. As a result of the determination, if a degree of color change is less than or equal to the preset threshold color change value, operation 355 is performed. In operation 355, the rendering apparatus performs rendering by using a mipmap image of a higher level subsequent to the calculated level among the mipmap images stored in the storage.

Otherwise, if it is determined in operation 340 that the degree of color change is greater than the preset threshold color change value, operation 350 is performed. In operation 350, the rendering apparatus generates a mipmap image of the calculated level. Thereafter, in operation 360, the rendering apparatus may perform rendering by using the generated mipmap image of the calculated level.

The rendering apparatus according to the embodiments described above with respect to FIG. 3 may receive a texture image and a degree of color change with respect to the texture image from which a degree of color change is calculated. A degree of color change of texture may be calculated by separate software and may be stored in the storage.

A rendering apparatus according to another embodiment may include, in the GPU 130, an additional logic to calculate a degree of color change. The rendering apparatus may calculate a degree of color change for each texture image and may store the degree of color change in the storage.

A rendering apparatus according to another embodiment may determine a degree of color change of a texture image based on a user setting. For example, the rendering apparatus may be set according to a user setting specifying that, if the mipmap image of the calculated level is not stored in the storage, rendering is performed by generating the mipmap image of the calculated level. In this case, the rendering apparatus may perform operation 350 and then subsequently perform operation 360. In another example, the rendering apparatus may be set according to a user setting specifying that, if the mipmap image of the calculated level is not stored in the storage, rendering is performed by using a mipmap image of a higher level subsequent to the calculated level. In this case, the rendering apparatus may perform operation 355.

A rendering apparatus according to another embodiment may perform rendering by adjusting a size of the preset threshold color change value that is a standard of determination of a degree of color change. For example, since operation 355 is more likely to be performed as the preset threshold color change value is set to be larger, while the quality of graphics may be degraded, a power consumption decrease rate may increase. For example, since operation 350 is more likely to be performed as the preset threshold color change value is set to be smaller, while the quality of graphics may be improved, a power consumption decrease rate may decrease.

As described above, in operation 355, the rendering apparatus performs rendering by using a mipmap image of a higher level subsequent to the calculated level among the mipmap images stored in the storage. When a degree of color change of a texture image is small, rendering by using an image that is smaller than the image of a requested size does not greatly affect the quality of graphics. Accordingly, when a degree of color change of a texture image is small, the rendering apparatus may perform rendering according to operation 355 by enlarging the mipmap image of a higher level subsequent to the calculated level among the mipmap images stored in the storage.

According to another embodiment, when a degree of color change of a texture image is less than the preset threshold color change value, a rendering apparatus may be set to perform rendering by using the mipmap image of a lower level prior to the calculated level among the mipmap images stored in the storage. In this case, the rendering apparatus may perform rendering by using an image that is larger than the image of a requested size.

According to another embodiment, when a degree of color change of a texture image is small, a rendering apparatus may be set to perform rendering by using a mipmap image of a level that is the closest level to the calculated level among the mipmap images stored in the storage.

As discussed above, in operation 350, the rendering apparatus generates a mipmap image of the calculated level. The rendering apparatus may store the generated mipmap image in the storage. In this case, when a request for the texture is received, the stored mipmap image may be used for rendering.

A rendering apparatus according to another embodiment may not store the generated mipmap image after using the generated mipmap image. In this case, memory usage needed for storing the generated mipmap image may be reduced.

Figure 4A:
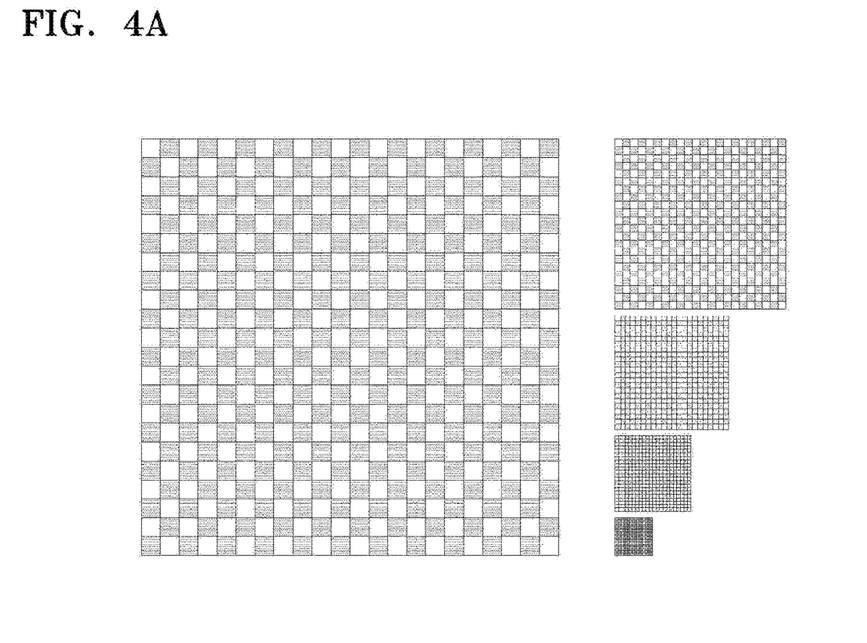
FIGS. 4A and 4B are views describing the method of FIG. 3.
Figure 4B:
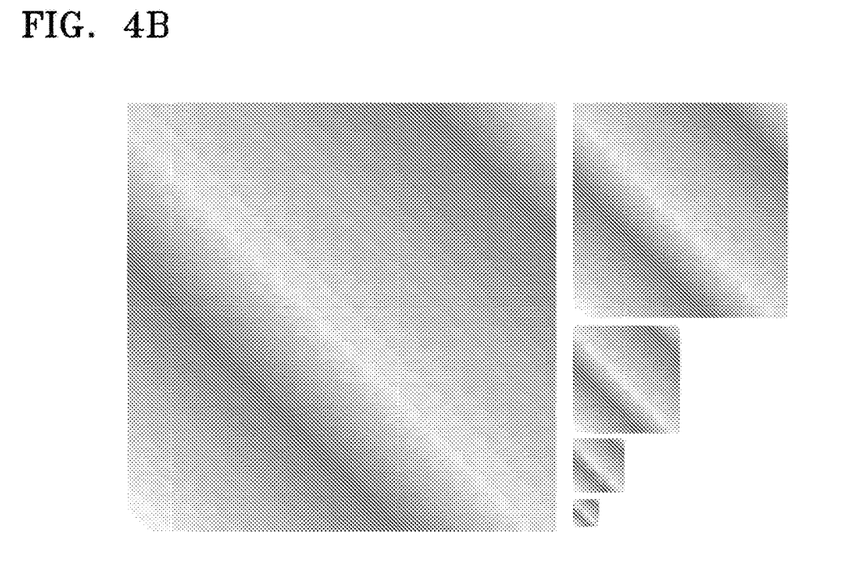

FIGS. 4A and 4B are views describing the method of FIG. 3.

FIG. 4A illustrates an example of a texture image in which a degree of color change is relatively high. Referring to FIG. 4A, in an image having a checkered pattern, it may be seen that a degree of color change is very high at boundary portions where a color changes, and the boundary portions where a color suddenly changes occupies a large portion of the texture image. In this case, when mipmap images are not consecutively generated, a probability of image distortion increases. Accordingly, to avoid image distortion, a mipmap image of a requested level is generated and set to be used for rendering.

FIG. 4B illustrates an example of a texture image in which a degree of color change is relatively small. Referring to FIG. 4B, it may be seen that a color gradually changes in the whole image and that a boundary portion where the color suddenly changes does not exist. In this case, even when mipmap images of levels other than a requested level are used for rendering by being expanded or reduced, the mipmap images are not distorted much. Accordingly, rendering is performed by using the mipmap images stored in the storage in order to reduce memory usage, although the stored mipmap images have different levels than the requested level.

Figure 5:
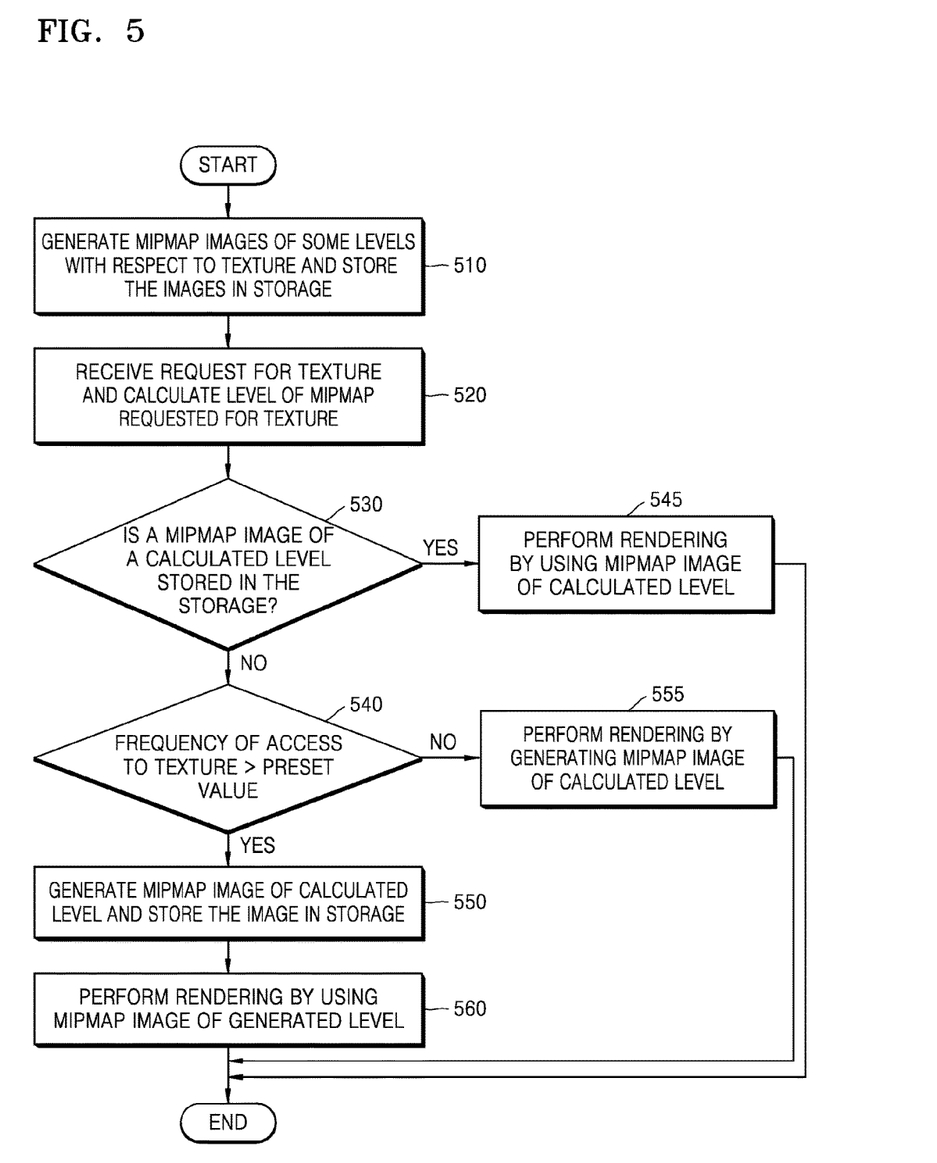
FIG. 5 is a flowchart of a method of performing rendering by determining frequency of access, according to another embodiment.

FIG. 5 is a flowchart of a method of performing rendering by determining frequency of access, according to another embodiment.

In operation 510, the rendering apparatus generates mipmap images of some levels, among all available preset levels, with respect to texture and stores the generated mipmap images in the storage. Since operation 510 of FIG. 5 is the same as Operation 210 of FIG. 2, a redundant description of operation 510 is omitted.

In operation 520, the rendering apparatus receives a request for texture and calculates a level of a mipmap requested with respect to the texture. Since operation 520 of FIG. 5 is the same as operation 220 of FIG. 2, a redundant description thereof is omitted.

In operation 530, the rendering apparatus determines whether a mipmap image of the calculated level is stored in the storage. As a result of the determination, if the mipmap image of the calculated level is stored in the storage, operation 545 is performed. In operation 545, the rendering apparatus performs rendering by using the mipmap image of the calculated level stored in the storage.

Alternatively, if it is determined in step 530 that the mipmap image of the calculated level is not stored in the storage, operation 540 is performed. In Operation 540, the rendering apparatus determines whether a frequency of access to texture is greater than a preset threshold frequency of access value.

If it is determined in operation 540 that the frequency of access is less than or equal to the preset threshold frequency of access value, operation 555 is performed. In operation 555, the rendering apparatus generates the mipmap image of the calculated level and performs rendering by using the generated mipmap image.

Otherwise, if it is determined in operation 540 that the frequency of access is greater than the preset threshold frequency of access value, operation 550 is performed. In operation 550, the rendering apparatus generates a mipmap image of the calculated level and stores the generated mipmap image in the storage. Thereafter, in operation 560, the rendering apparatus may perform rendering by using the generated mipmap image of the calculated level that is stored in the storage.

The rendering apparatus may count and store a frequency of access at a previous frame with respect to requested texture. The rendering apparatus may determine the frequency of access at the previous frame as a frequency of access to texture for which frequency of access is requested, and may compare the determined frequency of access with the preset threshold frequency of access value. In other words, by using similarity between frames, a frequency of access is determined based on an assumption that a frequency of access at a previous frame of the requested texture is similar to a frequency of access at a current frame.

For example, the rendering apparatus does not use mipmaps when rendering an N-th frame, may perform texturing by using a level that is the closest to a requested level, and may count a frequency of access to requested texture. Also, the rendering apparatus may count each of the requested levels of the requested texture. The rendering apparatus may perform the rendering method by using counting information obtained when rendering the N-th frame for rendering an (N+1)th frame.

A rendering apparatus according to another embodiment does not use mipmaps when an application is first executed, may perform texturing by using a level that is the closest to a requested level, and may count a frequency of access to requested texture. Also, the rendering apparatus may count each of the requested levels of the requested texture. The rendering apparatus may perform the rendering method of this embodiment by using counting information obtained when the application is first executed for executing the application thereafter.

A rendering apparatus according to another embodiment may determine a frequency of access to texture based on a user setting. For example, the rendering apparatus may be set according to a user setting specifying that, if the mipmap image of the calculated level is not stored in the storage, the calculated mipmap image is generated and stored so that rendering may be performed. In this case, the rendering apparatus may perform operation 550. In another example, the rendering apparatus may be set according to a user setting specifying that, when the mipmap image of the calculated level is not stored in the storage, the calculated mipmap image is generated so that rendering may be performed. In this case, the rendering apparatus may perform operation 555.

A rendering apparatus according to another embodiment may perform rendering by adjusting a size of the preset threshold frequency of access value that is a standard of determination of the frequency of access. For example, since operation 555 is more likely to be performed as the preset threshold frequency of access value is set to be larger, memory use may be greatly reduced.

As discussed above, in operation 555, the rendering apparatus generates the mipmap image of the calculated level and performs rendering by using the generated mipmap image. According to operation 555, when a frequency of access to texture is small, a frequency of use of the generated mipmap image is small and thus the mipmap image of the calculated level is only generated without storing the mipmap image of the calculated level, thereby reducing memory use.

According to another embodiment, when a frequency of access to texture is less than the preset threshold frequency of access value, a rendering apparatus may be set to perform rendering by using the mipmap image of a level closest to the calculated level among the mipmap images stored in the storage, without generating the mipmap image of the calculated level.

According to another embodiment, when a frequency of access to texture is less than the preset threshold frequency of access value, a rendering apparatus may be set to perform rendering by using the mipmap image of a lower level prior to the calculated level among the mipmap images stored in the storage. In this case, the rendering apparatus may perform rendering by using an image that is larger than the image of a requested size.

When a frequency of access to texture is less than the preset threshold frequency of access value, a rendering apparatus according to another embodiment may be set to perform rendering by using the mipmap image of a higher level subsequent to the calculated level among the mipmap images stored in the storage. In this case, the rendering apparatus may perform rendering by using an image that is smaller than the image of a requested size.

As discussed above, in operation 550, the rendering apparatus generates a mipmap image of the calculated level and stores the generated mipmap image in the storage. According to operation 550, when a frequency of access to texture is determined to be large, the rendering apparatus may generate and store a mipmap image of the calculated level. Then, when a request for the texture is received, the stored mipmap image may be used for rendering.

Figure 6:
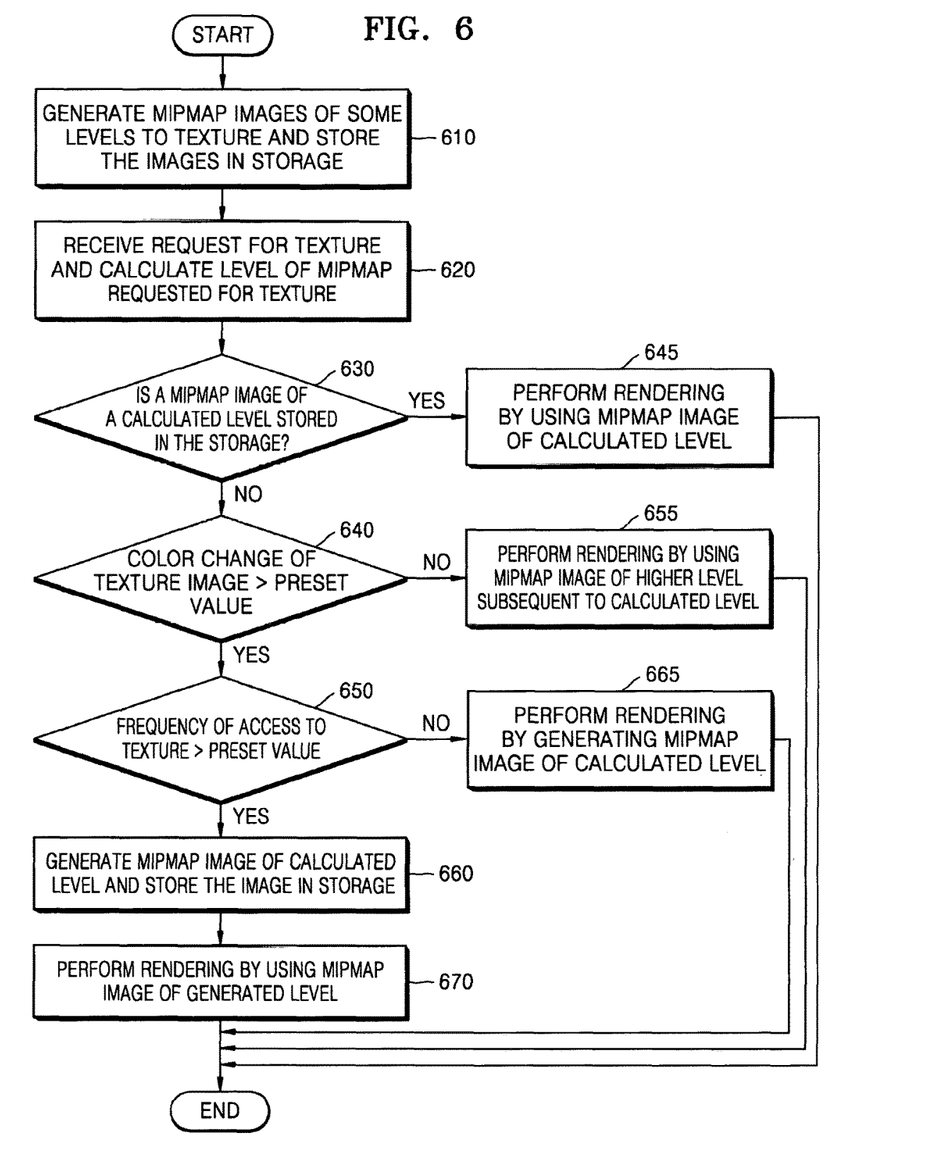
FIG. 6 is a flowchart of a method of performing rendering by determining the degree of color change and frequency of access, according to another embodiment.

FIG. 6 is a flowchart of a method of performing rendering by determining frequency of access, according to another embodiment.

In operation 610, the rendering apparatus generates mipmap images of some levels among all levels with respect to texture and stores the generated mipmap images in the storage. Since operation 610 of FIG. 6 is the same as operation 210 of FIG. 2, a redundant description of operation 610 is omitted.

In operation 620, the rendering apparatus receives a request for texture and calculates a level of a mipmap requested as to the texture. Since operation 620 of FIG. 6 is the same as operation 220 of FIG. 2, a redundant description of operation 620 is omitted.

In operation 630, the rendering apparatus determines whether a mipmap image of the calculated level is stored in the storage. As a result of the determination, if the mipmap image of the calculated level is stored in the storage, operation 645 is performed. In operation 645, the rendering apparatus performs rendering by using the mipmap image of the calculated level stored in the storage.

Alternatively, if it is determined in operation 630 that the mipmap image of the calculated level is not stored in the storage, operation 640 is performed. In operation 640, the rendering apparatus determines whether a degree of color change of the texture is greater than a preset threshold color change value. As a result of the determination, if a degree of color change is less than or equal to the preset threshold color change value, operation 655 is performed. In operation 655, the rendering apparatus performs rendering by using a mipmap image of a higher level subsequent to the calculated level among the mipmap images stored in the storage.

Alternatively, if it is determined in operation 640 that the degree of color change is greater than the preset threshold color change value, operation 650 is performed. In operation 650, the rendering apparatus determines whether a frequency of access to texture is greater than a preset threshold frequency of access value. As a result of the determination, if the frequency of access is less than or equal to the preset threshold frequency of access value, operation 665 is performed such that the rendering apparatus generates the mipmap image of the calculated level and performs rendering by using the generated mipmap image.

Otherwise, if the frequency of access is greater than the preset threshold frequency of access value, operation 660 is performed such that the rendering apparatus generates a mipmap image of the calculated level and stores the generated mipmap image in the storage. Thereafter, in operation 670, rendering is performed by using the generated mipmap image of the calculated level.

The rendering apparatus may receive a texture image and a degree of color change with respect to the texture image from which a degree of color change is calculated. A degree of color change of texture may be calculated by separate software and may be stored in the storage.

A rendering apparatus according to another embodiment may include, in the GPU 160, an additional logic to calculate a degree of color change. The rendering apparatus may calculate a degree of color change for each texture image and may store the degree of color change in the storage.

A rendering apparatus according to another embodiment may determine a degree of color change of a texture image based on a user setting.

A rendering apparatus according to another embodiment may perform rendering by adjusting a size of the preset threshold color change value that is a standard of determination of a degree of color change.

As discussed above, in operation 655, the rendering apparatus performs rendering by using a mipmap image of a higher level subsequent to the calculated level among the mipmap images stored in the storage. When a degree of color change of a texture image is small, rendering by using an image that is smaller than the image of a requested size does not greatly affect the quality of graphics. Accordingly, the rendering apparatus according to the present exemplary embodiment may perform rendering by enlarging the mipmap image of a level next to the calculated level among the mipmap images stored in the storage.

The rendering apparatus according to the above embodiments illustrated by FIG. 6 may count and store a frequency of access at a previous frame with respect to requested texture.

When an application is first executed, a rendering apparatus according to another embodiment may count and store a frequency of access to texture. The rendering apparatus may perform the rendering method by using counting information obtained when the application is first executed for executing the application thereafter.

A rendering apparatus according to another embodiment may determine a frequency of access to texture based on a user setting.

A rendering apparatus according to another embodiment may perform rendering by adjusting a size of the preset threshold frequency of access value that is a standard of determination of the frequency of access.

As described above, in operation 655, the rendering apparatus generates the mipmap image of the calculated level and performs rendering by using the generated mipmap image. Accordingly, when a frequency of access to texture is small, a frequency of use of the generated mipmap image is small and thus the mipmap image of the calculated level is only generated without storing the mipmap image of the calculated level, thereby reducing memory usage.

Thus, according the rendering method of FIG. 6, during texturing using the mipmap, since both of the degree of color change and the frequency of access are considered and thus rendering suitable for each situation is performed, it is possible to reduce the lowering of the quality of a graphic image, as well as reduce memory usage and the power consumption.

Figure 7:
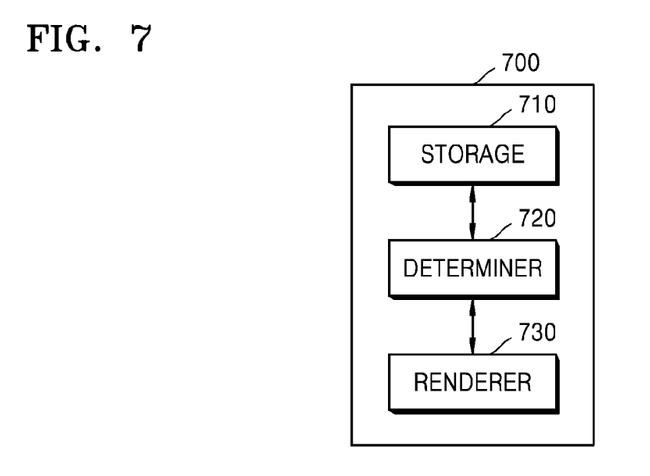
FIG. 7 is a block diagram of a structure of a rendering apparatus according to an example embodiment.

FIG. 7 is a block diagram of a structure of a rendering apparatus 700 according to an embodiment.

As illustrated in FIG. 7, the rendering apparatus 700 includes a storage 710, a determiner 720, and a renderer 730.

The storage 710 is configured to store mipmap images of some levels, among all available levels, that are previously generated with respect to texture. The storage 710 may include an internal memory and an external memory of the GPU 130.

The storage 710 according to an embodiment may be configured to store a newly generated mipmap image.

The determiner 720 is configured to receive a request for texture, calculate a level of the mipmap requested for texture, and determine whether a mipmap image of the calculated level is stored in the storage 710.

According to an embodiment, when the mipmap image of the calculated level is not stored in the storage 710, the determiner 720 may determine a degree of color change of a texture image.

According to another embodiment, when the mipmap image of the calculated level is not stored in the storage 710, the determiner 720 may determine a frequency of access to texture.

The renderer 730 is configured to perform rendering by using at least one of the mipmap images stored in the storage 710, based on a result of the determination by the determiner 720. According to an embodiment, when the mipmap image of the calculated level is not determined to be stored in the storage 710, the renderer 730 may perform rendering by using at least one of the stored mipmap images of levels adjacent to the calculated level.

According to another embodiment, the renderer 730 may perform rendering by using a mipmap image of a higher level subsequent to the calculated level, a mipmap image of a lower level prior to the calculated level, a mipmap image of a level that is the closest to the calculated level, or a newly generated mipmap image of the calculated level, among the mipmap images stored in the storage 710, according to the degree of color change determined by the determiner 720.

The renderer 730, according to another embodiment, may perform rendering by using a mipmap image of a higher level subsequent to the calculated level, a mipmap image of a lower level prior to the calculated level, a mipmap image of a level that is the closest to the calculated level, or a newly generated mipmap image of the calculated level, among the mipmap images stored in the storage 710, according to the frequency of access determined by the determiner 720.

Figure 8:
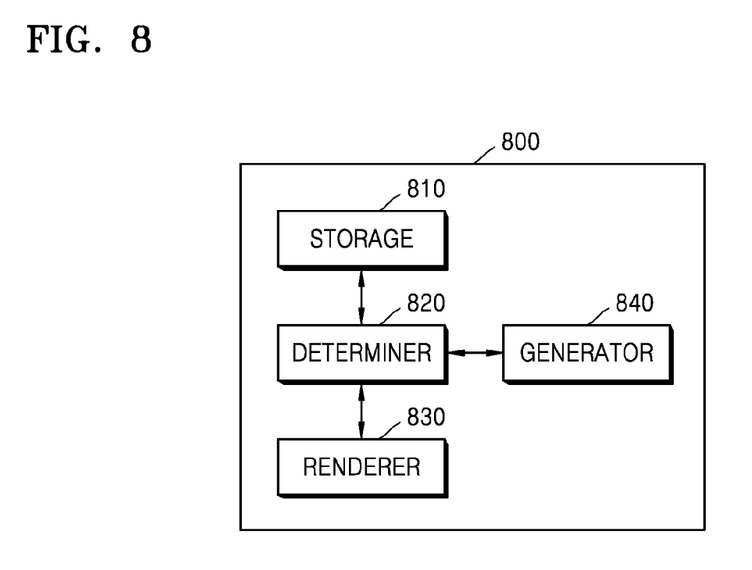
FIG. 8 is a block diagram of a structure of a rendering apparatus according to another embodiment.

FIG. 8 is a block diagram of a structure of a rendering apparatus 800 according to another embodiment.

As illustrated in FIG. 8, the rendering apparatus 800 includes a storage 810, a determiner 820, a renderer 830, and a generator 840. However, the rendering apparatus 800 may be embodied by more or less elements than the number of illustrated elements.

Since the storage 810, the determiner 820, and the renderer 830 of FIG. 8 are respectively the same as the storage 710, the determiner 720, and the renderer 730 of FIG. 7, redundant descriptions of these elements are omitted.

According to an embodiment, when the mipmap image of the calculated level is determined not to be stored in the storage 710, the generator 840 may generate a mipmap image of the calculated level.

According to another embodiment, when the determiner 820 determines that a degree of color change of a texture image is greater than a preset threshold color change value, the generator 840 may generate a mipmap image of the calculated level.

According to another embodiment, when the determiner 820 determines that a frequency of access is greater than a preset threshold frequency of access value, the generator 840 may generate a mipmap image of the calculated level. Also, when the determiner 820 determines that a frequency of access is less than a preset threshold frequency of access value, the generator 840 may generate a mipmap image of the calculated level by using a mipmap image of a lower level prior to the calculated level.

As described above, according to the rendering method of one or more of the above embodiments, the amount of calculations and memory needed to generate and store a mipmap image may be reduced. Also, the method of generating a mipmap image, according to the one or more of the above embodiments, may reduce unnecessary power consumption.

The apparatuses, units, modules, devices, and other components illustrated in FIGS. 1, 7 and 8 (such as the storage 710/810, determiner 720/820, renderer 730/830 and generator 840) that perform the operations described herein with respect to FIGS. 2, 3, 5 and 6 are implemented by hardware components. Examples of hardware components include controllers, sensors, generators, drivers, displays and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2, 3, 5 and 6. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 3, 5 and 6 that perform the operations described herein with respect to FIGS. 1, 7 and 8 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

The particular implementations shown and described herein are illustrative examples and are not intended to otherwise limit the scope of the present disclosure. For the sake of brevity, conventional electronics, control systems, software development and other functional aspects of the systems (and components of the individual operating components of the systems) may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rendering method comprising:
generating, using at least one processor, mipmap images of some levels with respect to at least one texture image and storing the generated mipmap images in a storage device;
receiving, using the at least one processor, a request for the at least one texture image;
calculating, using the at least one processor, a level of a mipmap requested for the at least one texture image;
determining, using the at least one processor, whether the storage device stores a mipmap image corresponding to the calculated level;
determining, using the at least one processor, a degree of color change within pixels of the requested at least one texture image based on a determination that the storage device does not store the mipmap image corresponding to the calculated level;
generating, using the at least one processor, the mipmap image of the calculated level based on the determination that the storage device does not store the mipmap image corresponding to the calculated level and the degree of color change is greater than a desired threshold color change value; and
rendering, using the at least one processor, the requested at least one texture image using the generated mipmap image of the calculated level.

2. The rendering method of claim 1, wherein the rendering comprises:
rendering, using the at least one processor, the requested at least one texture image using the stored mipmap image of the calculated level based on a determination that the storage device stores the mipmap image corresponding to the calculated level.

3. The rendering method of claim 1, wherein the rendering comprises:
rendering, using the at least one processor, the requested at least one texture image using at least one mipmap image of a level adjacent to the calculated level, among the stored mipmap images, based on the determination that the storage device does not store the mipmap image corresponding to the calculated level and the degree of color change is less than a desired threshold color change value.

4. The rendering method of claim 3, wherein the rendering comprises:
rendering, using the at least one processor, the requested at least one texture image using a mipmap image of a higher level subsequent to the calculated level, among the stored mipmap images, based on the determination that the storage device does not store the mipmap image corresponding to the calculated level and the degree of color change is less than a desired threshold color change value.

5. The rendering method of claim 3, wherein the rendering is performed according to a desired mode based on a user input, the user input indicating at least one of:

performing the rendering by generating a mipmap image of the calculated level using a mipmap image of a lower level prior to the calculated level, among the stored mipmap levels; and
performing the rendering by using a mipmap image of a higher level subsequent to the calculated level, among the stored mipmap levels.

6. The rendering method of claim 1, wherein the rendering comprises:
generating, using the at least one processor, the mipmap image of the calculated level and storing the generated mipmap image of the calculated level in the storage device based on the determination that the storage device does not store the mipmap image corresponding to the calculated level and a determined frequency of access to the requested at least one texture image is greater than a desired threshold frequency of access value; and
rendering, using the at least one processor, the requested at least one texture image using the generated mipmap image of the calculated level.

7. The rendering method of claim 6, wherein the rendering comprises:
rendering, using the at least one processor, the requested at least one texture image using at least one mipmap image of a level adjacent to the calculated level, among the stored mipmap images, based on the determination that the storage device does not store the mipmap image corresponding to the calculated level and the frequency of access is less than a desired threshold frequency of access value.

8. The rendering method of claim 7, wherein the rendering is performed according to a desired mode based on a user input, among a mode of performing rendering by generating a mipmap image of the calculated level by using a mipmap image of a lower level prior to the calculated level, among the stored mipmap levels, and a mode of performing rendering by using a mipmap image of a higher level subsequent to the calculated level, among the stored mipmap levels.

9. The rendering method of claim 6, wherein the determining of the frequency of access comprises counting a number of accesses of the requested at least one texture image at a previous frame.

10. The rendering method of claim 6, wherein the rendering comprises:
rendering, using the at least one processor, the requested at least one texture image using the stored mipmap image of the calculated level based on a determination that the storage device stores the mipmap image corresponding to the calculated level.

11. A rendering apparatus comprising:
a storage device configured to store mipmap images of some levels that were previously generated with respect to at least one texture image; and
at least one processor configured to execute computer readable instructions to,
receive a request for the at least one texture image,
calculate a level of a mipmap requested for the at least one texture image,
determine whether the storage device stores a mipmap image corresponding to the calculated level,
determine a degree of color change within pixels of the requested at least one texture image based on a determination that the storage device does not store the mipmap image corresponding to the calculated level, generate the mipmap image of the calculated level based on the determination that the storage device does not store the mipmap image corresponding to the calculated level and the degree of color change is greater than a desired threshold color change value, and render the requested at least one texture image using the generated mipmap image of the calculated level.

12. The rendering apparatus of claim 11, wherein the at least one processor is further configured to execute the computer readable instructions to:

render the requested at least one texture image using the stored mipmap image of the calculated level based on a determination that the storage device stores the mipmap image corresponding to the calculated level.

13. The rendering apparatus of claim 11, wherein the at least one processor is further configured to execute the computer readable instructions to:

render the requested at least one texture image using at least one mipmap image of a level adjacent to the calculated level, among the stored mipmap images, based on the determination that the storage device does not store the mipmap image corresponding to the calculated level and the degree of color change is less than a desired threshold color change value.

14. The rendering apparatus of claim 13, wherein the at least one processor is further configured to execute the computer readable instructions to:

render the requested at least one texture image using a mipmap image of a higher level subsequent to the calculated level among the stored mipmap images, based upon the determination that the storage device does not store the mipmap image corresponding to the calculated level and the degree of color change is less than or equal to a desired threshold color change value.

15. The rendering apparatus of claim 11, wherein the at least one processor is further configured to execute the computer readable instructions to:

generate the mipmap image of the calculated level and store the generated mipmap image of the calculated level in the storage device based on the determination that the storage device does not store the mipmap image corresponding to the calculated level and a determination that a frequency of access to the requested at least one texture image is greater than a desired threshold color change value; and render the requested at least one texture image using the generated mipmap image of the calculated level.

16. The rendering apparatus of claim 15, wherein the at least one processor is further configured to execute the computer readable instructions to:

render the requested at least one texture image using at least one mipmap image of a level adjacent to the calculated level, among the stored mipmap images, based on the determination that the storage device does not store the mipmap image corresponding to the calculated level and the frequency of access is less than a desired threshold frequency of access value.

17. The rendering apparatus of claim 15, wherein the at least one processor is further configured to execute the computer readable instructions to:

render the requested at least one texture image using a mipmap image of a lower level subsequent to the calculated level, among the stored mipmap images, based on a determination that the storage device stores the mipmap image corresponding to the calculated level.

* * * * *